United States Patent [19]

Hirose et al.

[11] Patent Number: 5,358,662
[45] Date of Patent: Oct. 25, 1994

[54] LIQUID CRYSTAL COMPOSITION AND A LIQUID CRYSTAL DISPLAY ELEMENT USING THE SAME

[75] Inventors: Taku Hirose, Chibaken; Kanetsugu Terashima, Shigaken; Shinichi Sawada, Chibaken, all of Japan

[73] Assignee: Chisso Corporation, Osaka, Japan

[21] Appl. No.: 68,952

[22] Filed: May 28, 1993

[30] Foreign Application Priority Data

May 28, 1992 [JP] Japan .................................. 4-160011

[51] Int. Cl.$^5$ ...................... C09K 19/30; C09K 19/52; C09K 19/12; G02F 1/13
[52] U.S. Cl. ......................... 252/299.63; 252/299.01; 252/299.66; 252/299.67; 359/103
[58] Field of Search ...................... 252/299.01, 299.61, 252/299.62, 299.63, 299.64, 299.65, 299.66, 299.67; 359/103

[56] References Cited

U.S. PATENT DOCUMENTS

| | | | |
|---|---|---|---|
| 4,822,519 | 4/1989 | Saito et al. | 252/299.61 |
| 4,923,632 | 5/1990 | Sawada et al. | 252/299.61 |
| 5,055,220 | 10/1991 | Uchida et al. | 252/299.01 |
| 5,122,295 | 6/1992 | Weber et al. | 282/299.01 |
| 5,167,860 | 12/1992 | Sawada et al. | 252/299.63 |
| 5,171,469 | 12/1992 | Hittich et al. | 252/299.01 |
| 5,208,386 | 4/1993 | Sasaki et al. | 568/661 |
| 5,233,445 | 8/1993 | Kamath et al. | 252/299.01 |

FOREIGN PATENT DOCUMENTS

| | | |
|---|---|---|
| 0416117 | 3/1991 | European Pat. Off. . |
| 0422958 | 4/1991 | European Pat. Off. . |
| 0470590 | 2/1992 | European Pat. Off. . |
| WO91/10716 | 7/1991 | PCT Int'l Appl. . |
| WO91/16398 | 10/1991 | PCT Int'l Appl. . |
| WO91/16399 | 10/1991 | PCT Int'l Appl. . |

*Primary Examiner*—Shean Wu
*Attorney, Agent, or Firm*—Wenderoth, Lind & Ponack

[57] ABSTRACT

A liquid crystal composition comprising (1) at least one compound selected from those expressed by the formula (I) and (2) at least one compound selected from those expressed by the formulas (II), (III), (IV) and (V):

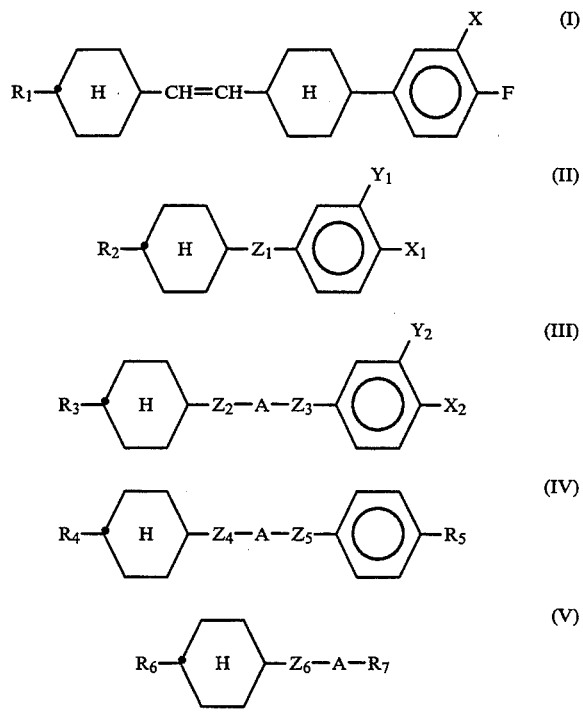

wherein $R_1$ to $R_5$ are $C_{1-10}$ alkyl; $R_6$ and $R_7$ are $C_{1-10}$ alkyl or alkenyl; X is H or F; $X_1$ and $X_2$ are F, $-CF_3$, $-OCF_3$, $-CHF_2$ or $-OCHF_2$; $Y_1$ and $Y_2$ are H or F; $Z_1$, $Z_2$ and $Z_4$ are $-COO-$, $-CH_2CH_2-$ or a single bond; $Z_3$, $Z_5$ and $Z_6$ are $-COO-$, $-CH_2CH_2-$, $-C\equiv C-$ or a single bond; and A is

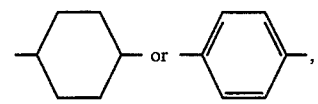

which composition is provided with characteristics of high specific resistance, low viscosity while keeping small current consumption, a suitable clearing point and threshold voltage.

6 Claims, 1 Drawing Sheet

FIG. 1

LIQUID CRYSTAL COMPOSITION AND A LIQUID CRYSTAL DISPLAY ELEMENT USING THE SAME

BACKGROUND OF THE INVENTION

1. Field of the Invention

This invention relates to a liquid crystal composition and a liquid crystal display element using the same. More particularly, it relates to a nematic liquid crystal composition for liquid crystal display elements according to active matrix mode needing a high reliability, and a liquid crystal display element using the liquid crystal composition.

2. Description of the Related An

As the development theme directed to LCD (liquid crystal display device), two points of a high density display (high contrast) and a high speed response have been mentioned, and have been researched along with the display mode. Among LCDs, active matrix liquid crystal display (AM-LCD) such as TFT (thin film transistor), etc., has been advanced in the aspects of colorization and higher densification and has been regarded as a favorite of flat panel display. However, even this AM-LCD has been far inferior in the aspects of densification, response speed, size of display area, etc., to CRT having been most prevailing now. Thus, active researches have been carried out into various elements constituting AM-LCD such as driving circuit, switching element, color filter, etc. Further, for liquid crystal materials, various specific features which cannot be satisfied by conventional materials such as biphenyls, PCHs, etc., having cyano group have been required.

The present inventors have considered that, in the case of compounds having cyano group(s) as terminal group or side chain, this cyano group has a certain interaction with ionic impurities present in display elements, and as a result, has a bad influence upon current value and specific resistance value and hence display contrast. Thus, compounds having a cyano group cause reduction in the reliability of elements, concretely increase in the current consumption and reduction in the specific resistance value in cooperation with the driving current of two-terminal or three-terminal switching element, and also cause display unevenness and reduction in the contrast as regards the display specific features of the elements.

Figure 1:
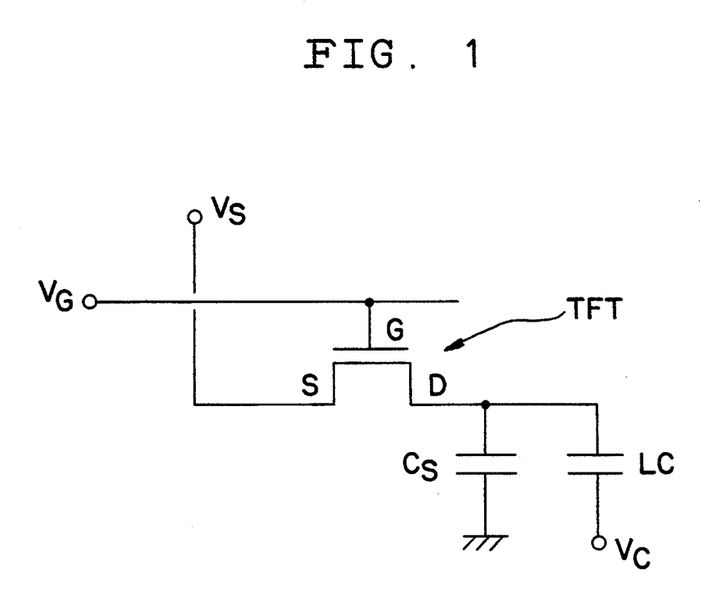

For example, the contrast in the TFT display element shown in FIG. 1 is closely related to its signal voltage-holding characteristics. The signal voltage-holding characteristics refer to the extent of reduction in the signal voltage impressed on the TFT pixels containing liquid crystals in a definite frame period.

Thus, when the signal voltage is not reduced, no reduction in the contrast occurs. Further, as to the signal voltage-holding characteristics, the less the storage capacity (Cs) provided in parallel to liquid crystal (LC) and the specific resistance of LC, synergistically the worse the voltage-holding characteristics. In particular, when the specific resistance of liquid crystal is the lower limit value or lower, the voltage-holding characteristics are exponentially made inferior to thereby extremely reduce the contrast. In particular, in the case where no storage capacity is added for the reason of simplification of TFT preparation process or the like, contribution of the storage capacity cannot be expected so that a liquid crystal composition having a particularly high specific resistance is required.

From such a viewpoint, a liquid crystal composition for AM-LCD composed only of compounds containing no cyano group is disclosed in, for example, Japanese patent application laid-open No. Hei 2-289682. Further, in Japanese patent application laid-open No. Sho 63-61083, particularly a number of compositions composed only of compounds having no cyano group among compounds included in a TN composition have been used.

However, LCD using such compositions has a high threshold voltage and hence is unsuitable to low voltage drive; thus a 5 V single drive is difficult and the LCD is insufficient for a display of a portable device driven by a battery. Further, since the composition has a high viscosity and the response speed of the LCD is slow, such drawbacks are raised that the display grade is reduced in the case of moving image display and it is impossible to respond to quick mouse movement or scrolling document in a word processor display.

As described above, in the case of AM-LCD using a liquid crystal composition composed only of compounds having no cyano group, it is difficult to attain a low threshold voltage sufficient for carrying out battery drive and a quick response speed sufficient for obtaining a high grade moving image display in office automation equipment, while satisfying the requirements of a small current consumption and a high specific resistance for retaining the reliability and the high contrast characteristic of the LCD.

An object of the present invention is to provide a liquid crystal composition having a high specific resistance and a small current consumption and yet a low viscosity.

Another object of the present invention is to provide a liquid crystal display element which uses the above liquid crystal composition and exhibits a high contrast, a high reliability, a quick response time and a high grade, moving image display and can correspond to quick movement of a mouse and scrolling in office automation equipment.

SUMMARY OF THE INVENTION

The present invention has the following constitutions:

1. A liquid crystal composition comprising:
   (1) a first component which comprises at least one compound expressed by the formula (I)

wherein $R_1$ represents an alkyl group or an alkenyl group of 1 to 10 carbon atoms, in which one or two non-adjacent carbon atom(s) may be substituted by oxygen atom(s), and X represents a hydrogen atom or a fluorine atom, and (2) a second component which comprises at least one compound selected from the group consisting of the respective compounds expressed by the formulas (II), (III), (IV) and (V):

wherein $R_2$, $R_3$, $R_4$ and $R_5$ are each as defined in $R_1$; $R_6$ and $R_7$ each independently represent an alkyl group or an alkenyl group of 1 to 10 carbon atoms, in which one or two non-adjacent methylene group(s) may be substituted by oxygen atom(s) or carboxyl group(s); $X_1$ and $X_2$ each represent a fluorine atom, a trifluoromethyl group, a trifluoromethoxy group, a difluoromethyl group or a difluoromethoxy group; $Y_1$ and $Y_2$ each represent a hydrogen atom or a fluorine atom; $Z_1$, $Z_2$ and $Z_4$ each represent a single bond, a carbonyloxy group or an ethan-1,2-diyl group; $Z_3$, $Z_5$ and $Z_6$ each represent a single bond, a carbonyloxy group, an ethan-1,2-diyl group or an ethyn-1,2-diyl group; and A represents a 1,4-cyclohexylene group or a 1,4-phenylene group at least one hydrogen atom of which groups may be substituted by fluorine atom(s).

2. A liquid crystal composition according to item 1, wherein the second component comprises at least one compound expressed by the formula (II).

3. A liquid crystal composition according to item 1, wherein the second component comprises at least one compound expressed by the formula (II) and at least one compound expressed by the formula (III).

4. A liquid crystal composition according to item 1, wherein the second component comprises at least one compound expressed by the formula (II), at least one compound expressed by the formula (III) and at least one compound expressed by the formula (IV).

5. A liquid crystal composition according to item 1, wherein the second component comprises at least one compound expressed by the formula (II), at least one compound expressed by the formula (III), at least one compound expressed by the formula (IV) and at least one compound expressed by the formula (V).

6. A liquid crystal display device comprising a liquid crystal composition as defined in item 1.

BRIEF DESCRIPTION OF THE DRAWING

FIG. 1 shows an equivalent circuit of a TFT display element. In this figure, G: gate electrode, S: source electrode, D: drain electrode, Cs: storage capacity, LC: liquid crystal, Vg: scanning signal, Vs: display signal, Vc: direct current voltage.

DETAILED DESCRIPTION OF PREFERRED EMBODIMENTS $R_1$ in the above formula (I) represents, as described above, an alkyl group or alkenyl group of 1 to 10 carbon atoms, in which one or two non-adjacent carbon atoms may be substituted by oxygen atom(s), and it is preferably a linear alkyl group or alkoxy group of 1 to 10 carbon atoms, more preferably a linear alkyl or alkoxy group of 1 to 5 carbon atoms.

Further, the formula (I) may be represented by the following formulas (IA) or (IB):

wherein $R_1$ is as defined above and DFP represents the following formula:

and this applies to the succeeding similar formulas.

The compound expressed by the formula (I) is disclosed in Japanese patent application laid-open No. Hei 3-127748 and has specific features of high clearing point, broad liquid crystal phase range and low viscosity.

As representative examples among compounds expressed by the formula (I), compounds of the formula (IA) or (IB) wherein $R_1$ represents a linear alkyl group of 3 carbon atoms (i.e. propyl group) (the compounds being respectively represented by IA3 or IB3) may be mentioned.

Mixtures of the compound IA3 or IB3 with a commercially available cyclohexanebenzonitrile liquid crystal Zli-1083 (trade name made by E. Merck, hereinafter referred to as "commercially available liquid crystal 83") were prepared, the mixtures being respectively referred to as IA3(P) or IB3(P). The physical properties of IA3(P), IB3(P) and the commercially available liquid crystal 83 are shown in Table 1.

TABLE 1

| | IA3(P) | IB3(P) | Commercially available liquid crystal 83 |
|---|---|---|---|
| Mixture (parts by weight) | | | |
| IA3 | 15 | | |
| IB3 | | 15 | |
| Commercially available LC 83 | 85 | 85 | 100 |
| Characteristics | | | |
| Melting point Mp (°C.) | <−10 | <−20 | |
| Clearing point Cp (°C.) | 63.0 (123.6) | 58.5 (93.6) | 52.3 |
| Viscosity | 20.1 | 21.8 | 21.7 |

TABLE 1-continued

|  | IA$_3$(P) | IB$_3$(P) | Commercially available liquid crystal 83 |
|---|---|---|---|
| (20° C.) $\eta_{20}$ (cP) | (11.0) | (22.4) | |
| Optical anisotropy $\Delta n$ | 0.116 (0.099) | 0.115 (0.092) | 0.119 |
| Dielectric anisotropy $\Delta\epsilon$ | 10.1 (6.7) | 10.0 (6.0) | 10.7 |

*Numerals inside the parentheses represent extrapolated values.

The numeral values inside the parentheses in Table 1 were sought according to extrapolation method wherein the values of physical properties of the mixtures were sought regarding the mixed weight as having an additive property.

As apparent from the extrapolated values in Table 1, IA$_3$ and IB$_3$ exhibit common properties in the aspects of physical properties, such as positive dielectric anisotropies of 6.7 and 6.0, high clearing points of 123.6° C. and 93.6° C. and low viscosities of 11.0 cP and 22.4 cP for materials of three rings, respectively. A mixture (IB(E)) obtained by blending three kinds of compounds of the formula (IB) wherein R$_1$ represents alkyl groups of 2, 3 and 5 carbon atoms, respectively, in a proportion of 1:1:1 has a crystal-nematic transition point (CN (°C.)) and a nematic-isotropic transition point (NI (°C.)) shown below in Table 2.

TABLE 2

|  | IB (E) |
|---|---|
| CN (°C.) | <−10 |
| NI (°C.) | 122.2 |

As apparent from Table 2, as to the compound expressed by the formula (I), even when only three components belonging thereto are used, it is possible to afford a broad liquid crystal temperature range.

R$_2$ in the above formula (II) represents an alkyl group or alkenyl group of 1 to 10 carbon atoms and one carbon atom or two non-adjacent carbon atoms in the group may be replaced by oxygen atom, and R$_2$ is preferably a linear alkyl group or alkoxy group of 1 to 10 carbon atoms, more preferably a linear alkyl group or alkoxy group of 1 to 7 carbon atoms.

Preferable examples of compounds expressed by the formula (II) are as follows:

(II A)

(II B)

(II C)

(II D)

(II E)

(II F)

(II G)

(II H)

(II I)

(II J)

(II K)

(II L)

(II M)

(II N)

In the above formulas, DFP and R$_2$ are as defined above. Examples of particularly preferable compounds are as follows:

(II A)

(II B)

-continued (II C)

(II D)

Compounds of the above formulas (IIA), (IIB) and (IIC) wherein any of the respective $R_2$'s represent a linear alkyl group of 5 carbon atoms, the respective compounds being referred to as $IIA_5$, $IIB_5$ and $IIC_5$, were respectively dissolved in commercially available liquid crystal 83 in a concentration of 15% by weight. The resulting values of physical properties (extrapolated values) are shown in Table 3.

TABLE 3

|  | $IIA_5$ | $IIB_5$ | $IIC_5$ |
|---|---|---|---|
| NI (°C.) | −47.3 | −52.7 | 9.3 |
| $\eta 20$ (cP) | −8.2 | −12.2 | −8.2 |
| $\Delta n$ | 0.007 | −0.007 | 0.033 |
| $\Delta \epsilon$ | 10.9 | 10.9 | 9.6 |

As apparent from Table 3, $IIA_5$, $IIB_5$ and $IIC_5$ have common physical properties such as positive dielectric anisotropy values of 9.6 to 10.9 and low viscosities of −8.2 to −12.2 cP. Further, these compounds have a high specific resistance.

The proportion of the compound expressed by the formula (II) used in the liquid crystal composition of the present invention is suitably 30% by weight or less, taking into consideration the reduction of clearing point, etc. accompanying the addition of the compound.

In the above formula (III), $R_3$ represents an alkyl group or alkenyl group of 1 to 10 carbon atoms and one carbon atom in the group or two non-adjacent carbon atoms therein may be replaced by oxygen atom(s), and the group is preferably a linear alkyl group or alkoxy group of 1 to 5 carbon atoms.

Examples of preferable compounds among those expressed by the formula (III) are as follows:

(III A)

(III B)

(III C)

(III D)

(III E)

(III F)

(III G)

(III H)

(III I)

(III J)

(III K)

(III L)

(III M)

(III N)

(III O)

(III P)

(III Q)

(III R)

$R_3$ and DFP in the above formulas are as defined above. The characteristics of these compounds are a high clearing point, a positive dielectric anisotropy value, a low viscosity for the three-ring system and a high specific resistance.

In the above formula (IV), $R_4$ and $R_5$ may be the same or different, and are an alkyl group or an alkenyl group of 1 to 10 carbon atoms, and one carbon atom in the groups or two non-adjacent carbon atoms therein may be replaced by oxygen atom(s), and the groups are preferably a linear alkyl group or alkoxy group of 1 to 10 carbon atoms, particularly preferably a linear alkyl group or alkoxy group of 1 to 5 carbon atoms.

Examples of preferable compounds among those expressed by the formula (IV) are as follows:

Examples of particularly preferable compounds are as follows:

(IV J)

(IV K)

(IV L)

(IV M)

In the above formulas, R₄ and R₅ are as defined above.

Examples of particularly preferable compounds are as follows:

(IV A)

(IV B)

(IV C)

(IV G)

In the above formulas, $R_4$ and $R_5$ are as defined above.

The characteristics of these compounds are a high clearing point, a low viscosity and a neutral dielectric anisotropy.

The proportion of the compound expressed by the formula (IV) used in the liquid crystal composition of the present invention is suitably 30% by weight or less, taking into account the increase of the threshold voltage, etc. accompanying the addition of the compound.

In the above formula (V), $R_6$ and $R_7$ may be the same or different, and are each an alkyl group or alkenyl group of 1 to 10 carbon atoms, and one CH₂ group in the groups or two non-adjacent CH₂ groups therein may be replaced by oxygen atom(s) or COO group(s), and they are preferably a linear alkyl group or alkoxy group of 1 to 10 carbon atoms, particularly preferably a linear alkyl group or alkoxy group of 1 to 7 carbon atoms.

Examples of preferable compounds among those expressed by the formula (V) are as follows:

(V A)

(V B)

(V C)

(V D)

(V E)

(V F)

(V G)

(V H)

(V I)

(V J)

(V K)

(V L)

In the above formulas, $R_6$ and $R_7$ are as defined above.

Examples of particularly preferable compounds are as follows:

(V A)
(V B)
(V C)
(V D)
(V F)
(V G)
(V H)

In the above formulas, R$_6$ and R$_7$ are as defined above.

These compounds have a very low viscosity, a neutral dielectric anisotropy and a superior compatibility and highly contribute to making the specific resistance of the composition higher.

The proportion of the compound expressed by the formula (V) used in the liquid crystal composition of the present invention is suitably 25% by weight or less, taking into account the elevation of the threshold voltage, etc. accompanying the addition of this compound.

The liquid crystal composition of the present invention may contain other liquid crystal compounds or non-liquid crystalline compounds, in accordance with the object of liquid crystal elements using this composition, and in order to adjust the threshold voltage in the voltage-transmittance characteristics, liquid crystal temperature range, optical anisotropy, dielectric anisotropy, viscosity, etc., in a suitable quantity within a range wherein the effectiveness of the present invention is not damaged.

Examples of these compounds are as follows:

In the above formulas, R and R' each represent an alkyl group or alkoxy group of 1 to 10 carbon atoms.

The above compounds may be used in adequate combinations of two or more kinds.

A concrete example of the liquid crystal composition of the present invention is a liquid crystal composition containing a first component comprising at least one compound expressed by the formula (I) and a second component comprising at least one compound expressed by the formula (II). The respective proportions of the first component and the second component used in the liquid crystal composition are preferably 10 to 95% by weight and 3 to 30% by weight, respectively, based upon the total weight of the composition, and the total content of the first component and the second component is preferably at least 50% by weight. More preferably, the proportions of the first component and the second component used are respectively 20 to 80% by weight and 10 to 30% by weight, and the total content of the first component and the second component is at least 50% by weight.

Another concrete example of the liquid crystal composition of the present invention is a liquid crystal composition containing a first component comprising at least one compound expressed by the formula (I), a second component comprising at least one compound expressed by the formula (II) and a third component comprising at least one compound expressed by the formula (III). The respective proportions of the first component, the second component and the third component used in the liquid crystal composition are preferably 10 to 95% by weight, 3 to 30% by weight and 5 to 90% by weight based upon the total weight of the composition, and the total content of the first component, the second component and the third component is preferably at least 50% by weight. More preferably, the respective proportions of the first, second and third components are 20 to 80% by weight, 10 to 30% by weight and 10 to 50% by weight, and the total content of the first, second and third components are at least 60% by weight.

Another concrete example of the liquid crystal composition of the present invention is a liquid crystal composition containing a first component comprising at least one compound expressed by the formula (I), a second component containing at least one compound expressed by the formula (II), a third component comprising at least one compound expressed by the formula (III) and a fourth component comprising at least one compound expressed by the formula (IV). The respective proportions of the first, second, third and fourth components used in the liquid crystal composition are preferably 10 to 95% by weight, 3 to 30% by weight, 5 to 90% by weight and 3 to 30% by weight based upon the total weight of the composition and the total content of the first, second, third and fourth components is preferably at least 50% by weight. More preferably, the respective proportions of the first, second, third and fourth components used are 20 to 80% by weight, 10 to 30% by weight, 10 to 50% by weight and 10 to 30% by weight, and the total content of the first, second, third and fourth components is at least 70% by weight.

Another concrete example of the liquid crystal composition of the present invention is a liquid crystal composition containing a first component comprising at least one compound expressed by the formula (I), a second component comprising at least one compound expressed by the formula (II), a third component comprising at least one compound expressed by the formula (III), a fourth component comprising at least one compound expressed by the formula (IV) and a fifth component comprising at least one compound expressed by the formula (V). The respective contents of the first, second, third, fourth and fifth components used in the liquid crystal composition are preferably 10 to 95% by weight, 3 to 30% by weight, 5 to 90% by weight, 3 to 30% by by weight and 3 to 25% by weight based upon the total weight of the composition and the total content of the first, second, third, fourth and fifth components is preferably at least 50% by weight. More preferably, the respective proportions of the first, second, third, fourth and fifth components are 20 to 80% by weight, 10 to 30% by weight, 10 to 50% by weight, 10 to 30% by weight and 3 to 18% by weight, and the total content of the first, second, third, fourth and fifth components are at least 70% by weight.

EXAMPLE

The present invention will be described in more detail by way of Comparative examples and Examples.

The threshold voltage of the voltage-transmittance characteristics referred to herein means a voltage (percentage of absorption: 10%) in the case where the light transmittance in the direction of the optical axis vertical to the display surface is 90%, and the voltage is expressed by Vth. The specific resistance of liquid crystal refers to a value obtained by filling a liquid crystal into a liquid cell made by Ando Electrics Co., Ltd. (type: LE-21), followed by impressing a DC voltage of 10 V across the cell using a DC voltage source (type: HP4140B made by Hewlett Packard Co., Ltd.) equipped with a picoampere meter, the initial value being expressed by $\rho_o$ ($\Omega$cm), and a value after heating test at 80° C. (1,000 hours) being expressed by $\rho_H$. The liquid crystal for the heating test was preserved in a Pyrex glass vessel at 80° C. in a nitrogen gas atmosphere. As the period of the heating test time, 1,000 hours are generally regarded as a suitable time to represent a value close to saturated value. In addition, in the reliability test, weatherability test, and particularly, ultraviolet light resistance test, were excluded. The reason is considered to be in that the problem of resistance to deterioration by light can be regarded as fully solved due to recent development of ultraviolet light-cutting filter.

In the Comparative examples and Examples mentioned below, all of the liquid crystal compositions were prepared using the same recipe. In addition, "%" means "% by weight".

Comparative Example a

A liquid crystal composition consisting of, as the compounds of the formula (III), the following three compounds which have so far been known difluorophenylbicyclohexane compounds, was prepared:

33.3%

The characteristics of the liquid crystal composition were measured. The results are shown in Table 4.

Comparative Example b

A liquid crystal composition consisting of the following compounds was prepared:
As a compound of the formula (II), 12.0%, as compounds of the formula (III),

11.7%

11.7%

11.6%, as so far known difluorophenylcyclohexylethane compounds,

11.2%

5.6%

11.2%, as so far known difluorobiphenylcyclohexane compounds, 5.0%

5.0%

10.0%, and as so far known fluorophenylbicyclohexane compound, 5.0%.

The characteristics of the composition were measured. The results are shown in Table 4.

Comparative Example c

A liquid crystal composition consisting of the following compounds was prepared:
As a compound of the formula (II), 10.0%, as compounds of the formula (III),

10.0%

10.0%

10.0%, as so far known difluorobiphenylcyclohexane compounds,

7.0%

7.0%

14.0%, as compounds of the formula (IV), 6.0%

9.0%

5.0%

2.0%, and as a compound of the formula (V),

10.0%.

The characteristics of the composition were measured. The results are shown in Table 4.

EXAMPLE 1

A liquid crystal composition consisting of the following compounds was prepared:

As compounds of the formula (I):

39.0%

39.0%, and as compounds of the formula (II), 12.0%

10.0%.

The characteristics of the composition were measured. The results are shown in Table 4.

EXAMPLE 2

A liquid crystal composition consisting of the following compounds was prepared:

As compounds of the formula (I):

15.0%

15.0%, as compounds of the formula (II),

10.0%

10.0%

10.0%, and as compounds of the formula (III), 11.7%

11.7%

11.6%

5.0%.

The characteristics of the composition were measured. The results are shown in Table 4.

EXAMPLE 3

A liquid crystal composition consisting of the following compounds was prepared:

As compounds of the formula (I),

15.0%

-continued

15.0%, as compounds of the formula (II),

10.0%

5.0%, as compounds of the formula (III),

10.0%

10.0%

10.0%

5.0%, and as compounds of the formula (IV), 8.0%

7.0%

5.0%.

The physical properties of the composition were measured. The results are shown in Table 5.

EXAMPLE 4

A liquid crystal composition consisting of the following compounds was prepared:

As compounds of the formula (I),

10.0%

-continued

12.0%, as compounds of the formula (II),

10.0%

8.0%, as compounds of the formula (III),

7.0%

7.0%

14.0%, as compounds of the formula (IV), 6.0%

9.0%

5.0%

2.0%, and as a compound of the formula (V),

10.0%.

The characteristics of the composition were measured. The results are shown in Table 5.

EXAMPLE 5

A liquid crystal composition consisting of the following compounds was prepared:

As compounds of the formula (I), 10.0%

10.0%

10.0%, as a compound of the formula (II), 10.0%, as compounds of the formula (III),

7.0%

7.0%

14.0%, as compounds of the formula (IV),

6.0%

9.0%

5.0%

2.0%, and as a compound of the formula (V),

10.0%.

The characteristics of the composition were measured. The results are shown in Table 5.

EXAMPLE 6

A liquid crystal composition consisting of the following compounds was prepared:

As compounds of the formula (I), 15.0%

15.0%

15.0%, as a compound of the formula (II),

16.0%, as compounds of the formula (III),

5.0%

5.0%

5.0%

2.0%

1.0%

2.0%

-continued

4.0%, as compounds of the formula (IV), 5.0%

5.0%, and as a compound of the formula (V),

5.0%.

The characteristics of the composition was measured. The results are shown in Table 5.

EXAMPLE 7

A liquid crystal composition consisting of the following compounds was prepared:

As compounds of the formula (I),

15.0%

15.0%, as compounds of the formula (II), 5.0%

2.5%

2.5%, as compounds of the formula (III),

4.5%

4.5%

9.0%

3.0%

4.0%

3.0%, as compounds of the formula (IV),

9.0%

3.0%

10.0%, and as a compound of the formula (V),

10.0%.

The characteristics of the composition were measured. The results are shown in Table 5.

EXAMPLE 8

A liquid crystal composition consisting of the following compounds was prepared:

As compounds of the formula (I),

15.0%

15.0%, as compounds of the formula (II),

3.0%

10.0%

2.2%

2.2%, as compounds of the formula (III),

4.0%

2.0%

4.0%

4.0%

3.0%

4.0%

0.8%

0.8%, as compounds of the formula (IV), 5.0%

5.0%

5.0%, and as compounds of the formula (V), 5.0%

3.0%

4.0%, and as another compound, 3.0%.

The characteristics of the liquid crystal composition were measured. The results are shown in Table 5.

TABLE 4

| | example | | | | |
|---|---|---|---|---|---|
| | Comparative example | | | Example | |
| Characteristics | a | b | c | 1 | 2 |
| Clearing point NI (°C.) | 112.4 | 81.7 | 94.8 | 68.3 | 81.4 |
| Optical anisotropy Δn | 0.081 | 0.0847 | 0.100 | 0.073 | 0.084 |
| Viscosity (20° C.) $\eta_{20}$ (cP) | 27.8 | 25.4 | 23.7 | 16.3 | 15.8 |
| Dielectric anisotropy Δε | 5.6 | 4.7 | 3.5 | 4.6 | 4.2 |
| Threshold voltage | 2.27 | 1.83 | 2.14 | 1.44 | 1.84 |

TABLE 4-continued

| | Comparative example | | | Example | |
|---|---|---|---|---|---|
| Characteristics | a | b | c | 1 | 2 |
| Vth (V) | | | | | |
| Initial specific resistance $\rho_O$ ($\Omega$cm) | $3.7 \times 10^{13}$ | $1.8 \times 10^{13}$ | $1.4 \times 10^{13}$ | $7.9 \times 10^{13}$ | $2.9 \times 10^{13}$ |
| Specific resistance after heated $\rho_H$ ($\Omega$cm) | $1.1 \times 10^{12}$ | $7.3 \times 10^{11}$ | $5.9 \times 10^{11}$ | $3.1 \times 10^{12}$ | $8.9 \times 10^{11}$ |

TABLE 5

| | Example | | | | | |
|---|---|---|---|---|---|---|
| Characteristics | 3 | 4 | 5 | 6 | 7 | 8 |
| Clearing point NI (°C.) | 100.3 | 79.9 | 111.5 | 84.9 | 100.7 | 86.8 |
| Optical anisotropy $\Delta n$ | 0.087 | 0.096 | 0.104 | 0.082 | 0.109 | 0.100 |
| Viscosity (20° C.) $\eta_{20}$ (cP) | 15.9 | 15.6 | 17.0 | 19.1 | 18.6 | 14.1 |
| Dielectric anisotropy $\Delta\epsilon$ | 3.8 | 3.35 | 2.9 | 3.9 | 3.3 | 3.0 |
| Threshold voltage Vth (V) | 2.25 | 2.17 | 2.76 | 2.01 | 2.63 | 2.42 |
| Initial specific resistance $\rho_O$ ($\Omega$cm) | $3.7 \times 10^{13}$ | $2.2 \times 10^{13}$ | $2.4 \times 10^{13}$ | $4.2 \times 10^{13}$ | $2.9 \times 10^{13}$ | $2.4 \times 10^{13}$ |
| Specific resistance after heated $\rho_H$ ($\Omega$cm) | $1.3 \times 10^{12}$ | $7.7 \times 10^{11}$ | $8.0 \times 10^{11}$ | $1.9 \times 10^{12}$ | $6.2 \times 10^{11}$ | $6.9 \times 10^{11}$ |

When Comparative examples a to c are compared with Examples 1 to 8, it is seen that the liquid crystal compositions of the present invention have various notably improved characteristics, particularly viscosity. Further, when the first component is adequately combined with the second component to the fifth component, it is possible to obtain characteristics required for liquid crystal display elements, such as suitable clearing point and threshold voltage.

(Effectiveness of the Invention)

The liquid crystal composition of the present invention is provided with characteristics such as a high specific resistance and a low viscosity while keeping a small current consumption, and besides, a suitable clearing point and threshold voltage. Thus, the liquid crystal composition of the present invention can be suitably used for liquid crystal display elements, particularly for AM-LCD.

Further, the liquid crystal display element of the present invention using the liquid crystal composition provided with the above-mentioned characteristics exhibits a high contrast, a high reliability and yet a quick response time. Thus, it is possible to provide a liquid crystal display device for OA, capable of corresponding to high grade moving image display, rapid mouse movement or scrolling the document.

What we claim is:

1. A liquid crystal composition comprising:
   (1) a first component which comprises at least one compound expressed by the formula (I)

(I)

wherein $R_1$ represents an alkyl or alkenyl group of 1 to 10 carbon atoms, in which one or two non-adjacent methylene group(s) can be substituted by oxygen atom(s); and X represents a hydrogen atom or a fluorine atom, and (2) a second component which comprises at least one compound selected from the group consisting of the respective compounds expressed by the formulas (II), (III), (IV) and (V)

(II)

(III)

(IV)

(V)

wherein $R_2$, $R_3$, $R_4$ and $R_5$ are each as defined for $R_1$; $R_6$ and $R_7$ each independently represent an alkyl or alkenyl group of 1 to 10 carbon atoms, in which one or two non-adjacent methylene group(s) can be substituted by oxygen atom(s) or carboxyl group(s); $X_1$ and $X_2$ each represent a fluorine atom, a trifluoromethyl group, a trifluoromethoxy group, a difluoromethyl group or a difluoromethoxy group; $Y_1$ and $Y_2$ each represent a hydrogen atom or a fluorine atom; $Z_1$, $Z_2$ and $Z_4$ each represent a single bond, a carbonyloxy group or an ethan-1,2-diyl group; $Z_3$, $Z_5$ and $Z_6$ each represent a single bond, a carbonyloxy group, an ethan-1,2-diyl group or an ethyn-1,2-diyl group; and A represents a 1,4-cyclohexylene or phenylene group at least one hydrogen atom of which can be substituted by fluorine atom(s), and first and second components being contained in said composition in an amount of 50% by weight or more, with the proviso that no cyano compound is contained in said composition.

2. A liquid crystal composition according to claim 1, wherein the second component comprises at least one compound expressed by the formula (II).

3. A liquid crystal composition according to claim 1, wherein the second component comprises at least one compound expressed by the formula (II) and at least one compound expressed by the formula (III).

4. A liquid crystal composition according to claim 1, wherein the second component comprises at least one compound expressed by the formula (II), at least one compound expressed by the formula (III) and at least one compound expressed by the formula (IV).

5. A liquid crystal composition according to claim 1, wherein the second component comprises at least one compound expressed by the formula (II), at least one compound expressed by the formula (III), at least one compound expressed by the formula (IV) and at least one compound expressed by the formula (V).

6. A liquid crystal display device comprising a liquid crystal composition as defined in claim 1.

* * * * *